July 9, 1968
C. G. JOA
3,391,777
PAD CORNER TRANSFER MACHINE
Filed June 22, 1967
5 Sheets-Sheet 1
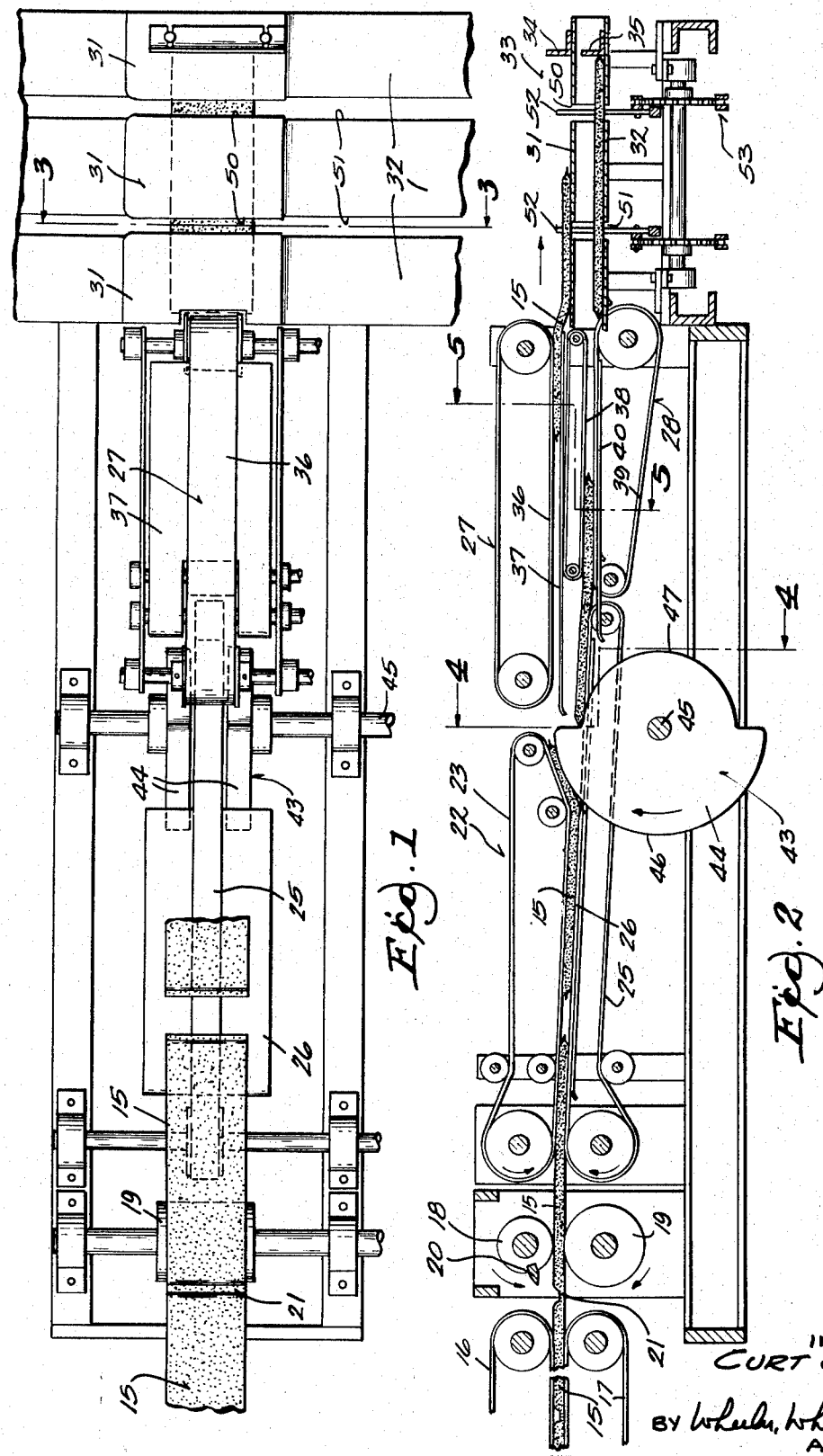
INVENTOR
CURT G. JOA
BY Wheeler, Wheeler & Wheeler
ATTORNEYS

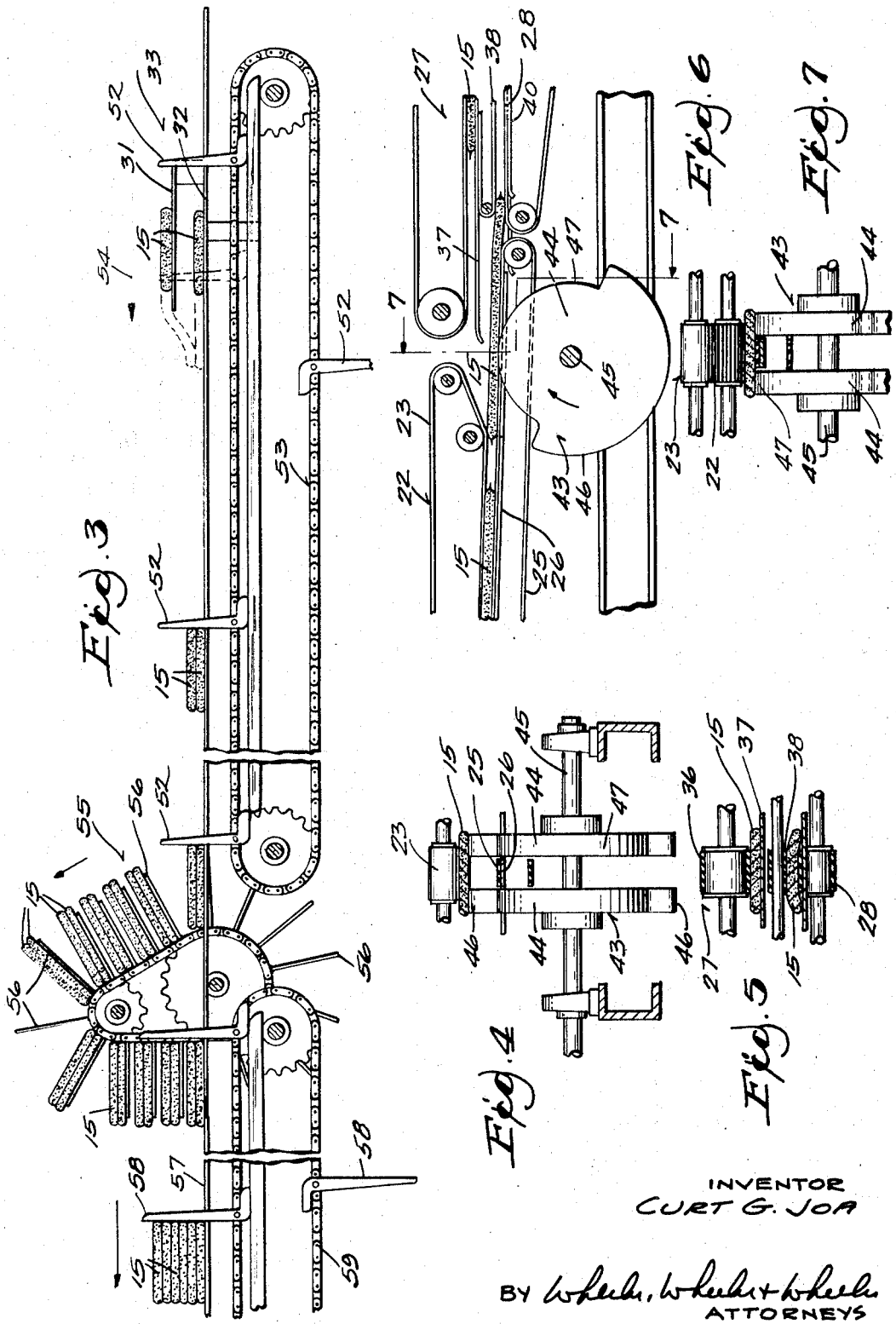

July 9, 1968
C. G. JOA
3,391,777
PAD CORNER TRANSFER MACHINE
Filed June 22, 1967
5 Sheets-Sheet 3
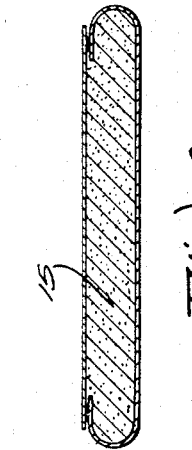
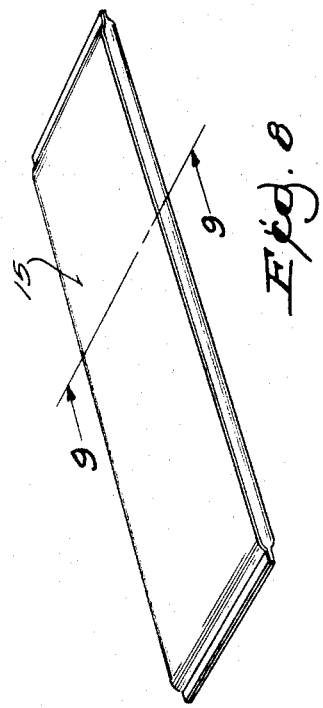
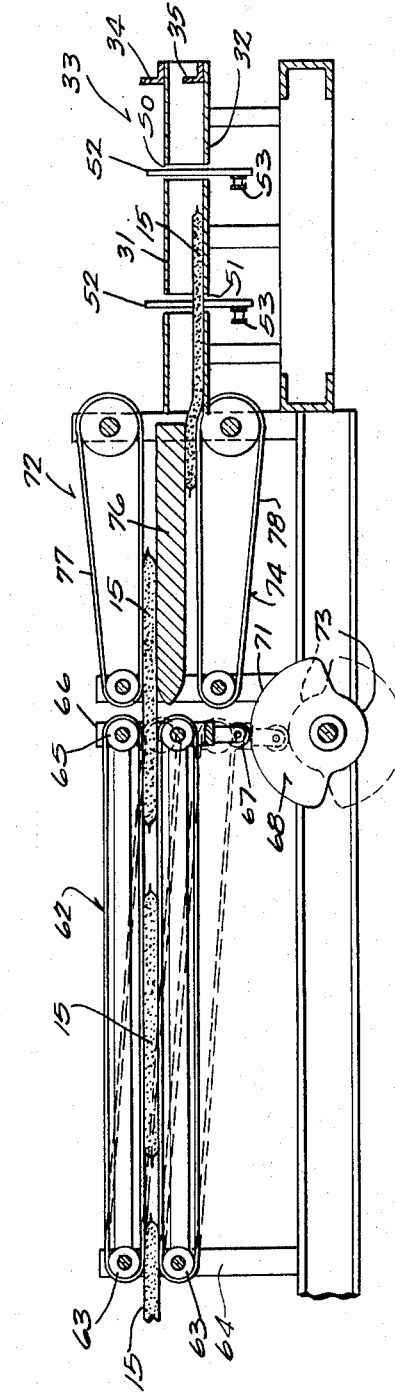
INVENTOR
CURT G. JOA
BY Wheeler, Wheeler & Wheeler
ATTORNEYS

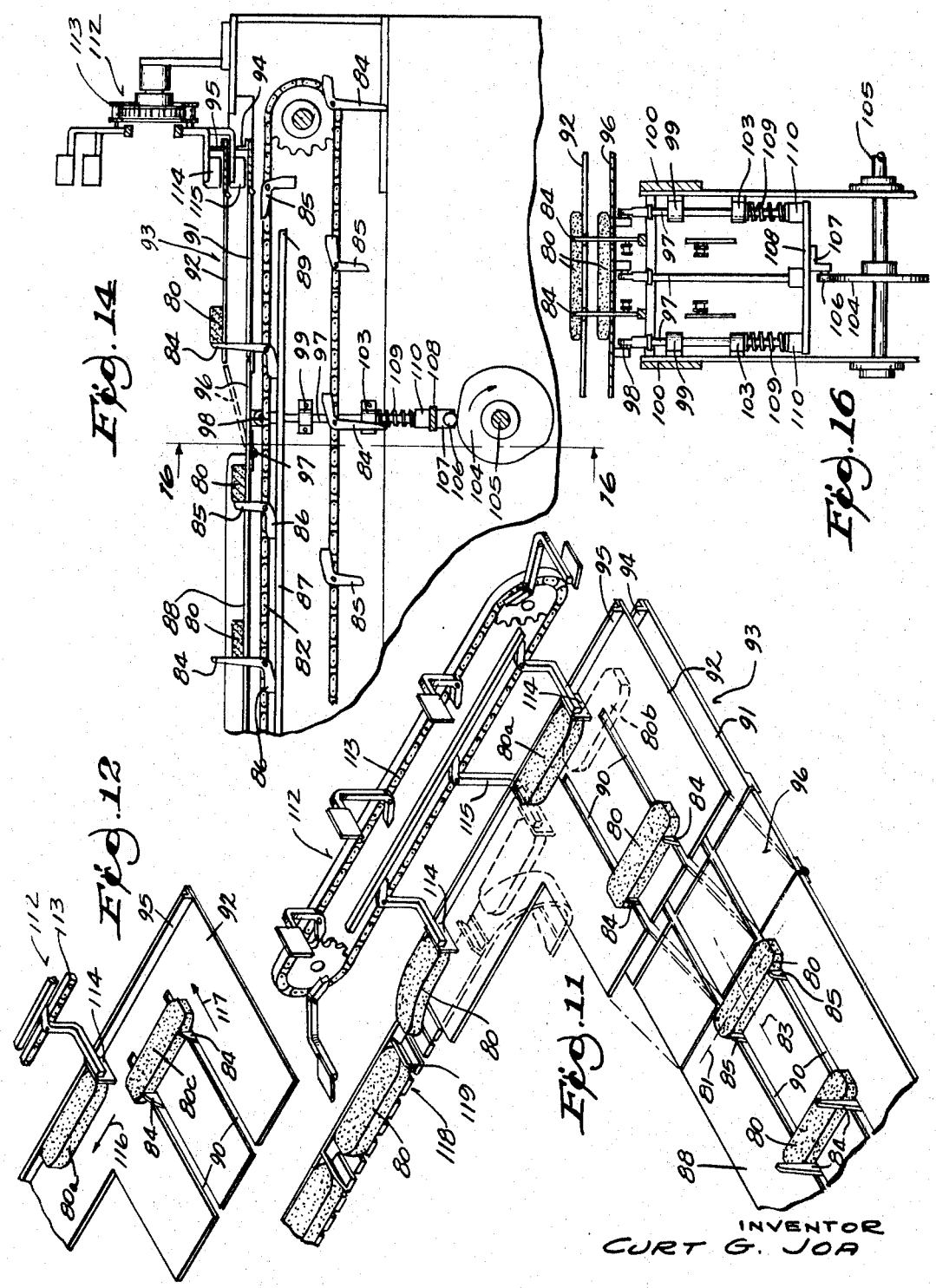

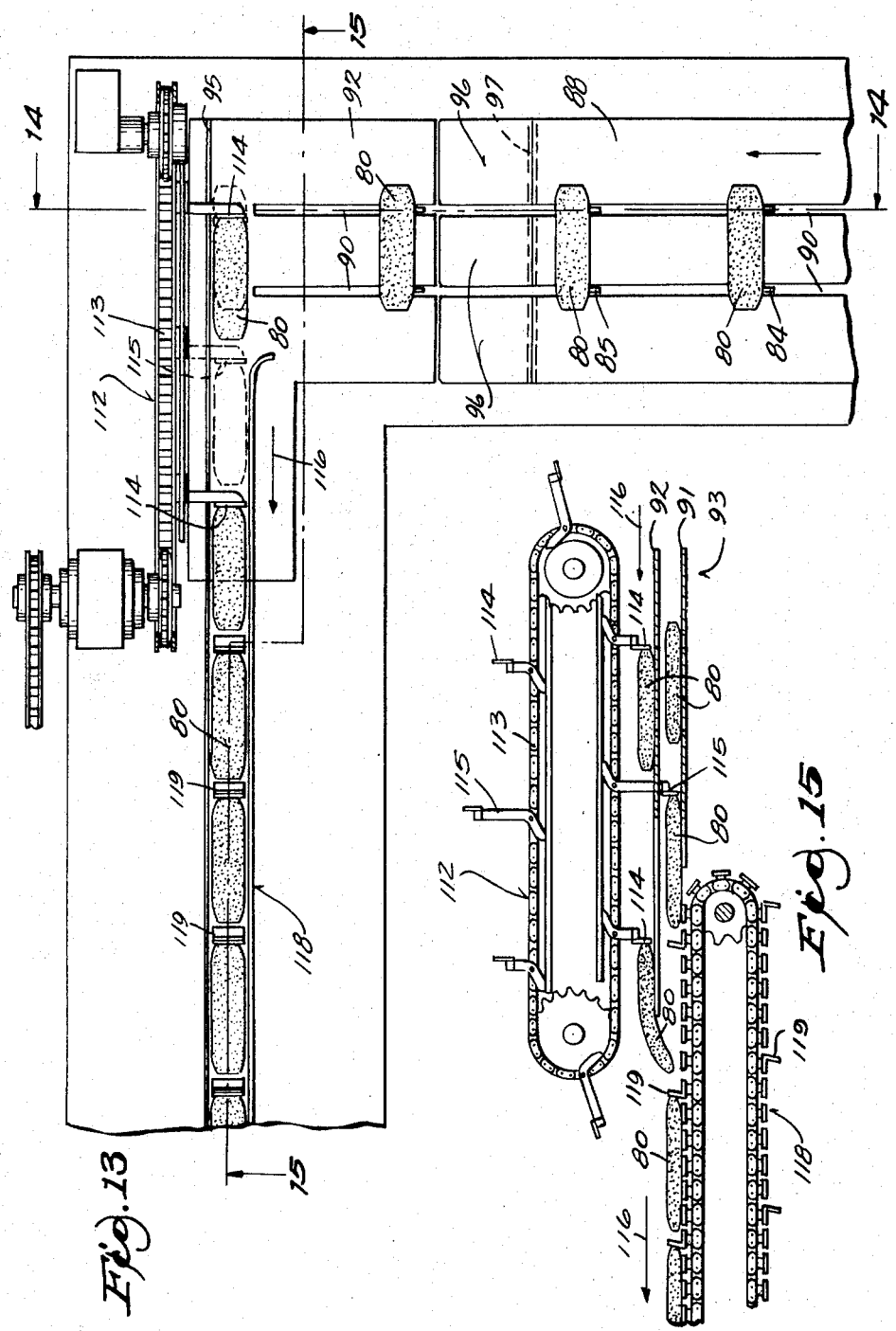

United States Patent Office 3,391,777
Patented July 9, 1968

3,391,777
PAD CORNER TRANSFER MACHINE
Curt G. Joa, Ocean Ridge, Fla.
(P.O. Box 1121, Boynton Beach, Fla. 33435)
Continuation-in-part of application Ser. No. 529,878,
Feb. 24, 1966. This application June 22, 1967, Ser.
No. 653,295
10 Claims. (Cl. 198—35)

ABSTRACT OF THE DISCLOSURE

This disclosure relates to a machine for the high speed transfer around a corner of pads such as are used in sanitary napkins, diapers, etc. The machine facilitates high speed transfer by separating the pads into multiple lanes at the corner so that in each lane there is a greater space between successive pads, thus to enable the pads to clear the corner without one pad crowding upon another.

Cross reference to related application

This application is a continuation-in-part of my copending U.S. patent application Ser. No. 529,878 filed Feb. 24, 1966.

Background of the invention

High speed pad transfer is difficult where the pads turn a corner in the machine. The input and output conveyors are transversely arranged. The pads are momentarily stopped at the corner in order to change direction. The input conveyor must release the pad before the output conveyor engages the pad. This all takes time. The conveying speed of prior art single-lane transfer machines is limited by these considerations.

Summary of the invention

In accordance with the present invention, the conveying speed of the transfer machine can be increased because the pads are separated at the corner into multiple lanes. The pads in each lane have a greater spacing than would be possible in a single-lane machine. Accordingly, ample time is provided for the pads to negotiate the corner. According to the present invention, the input conveyor delivers the pads alternately onto separate lanes on a receiving table from which the pads are removed by the output conveyor on a path transverse to their original direction. The pads can be separated into more than two lanes, to effectuate an even greater spacing between successive pads in each line. In the disclosed embodiments, the lanes are vertically spaced at different levels.

To exemplify the invention, several embodiments are disclosed. Some of these embodiments are specifically designed to handle diaper pads. Another embodiment is specifically designed to handle sanitary napkin pads. In all embodiments there is a transfer mechanism in the input conveyor to transfer successive pads from a primary single-lane conveyor into a secondary multiple lane conveyor.

Other objects, features and advantages will appear in the following disclosure.

Drawings

FIG. 1 is a fragmentary plan view of one embodiment of apparatus incorporating the invention, the parts being shown somewhat diagrammatically.

FIG. 2 is a fragmentary vertical section taken through the apparatus shown in FIG. 1, the elevator cam or wheel being shown lifting a pad to upper level.

FIG. 3 is a vertical cross section taken through the receiving table and stacking elevator, portions near the right of this view being taken along line 3—3 of FIG. 1.

FIG. 4 is a fragmentary cross section taken along the line 4—4 of FIG. 2.

FIG. 5 is a fragmentary cross section taken along the line 5—5 of FIG. 2.

FIG. 6 is a fragmentary cross section similar to that shown in FIG. 2, but showing the lift wheel passing a pad to the lower level.

FIG. 7 is a fragmentary cross section taken along the line 7—7 of FIG. 6.

FIG. 8 is a perspective view of a diaper which illustrates the type of pad processed on one embodiment of the present invention.

FIG. 9 is a cross section taken along the line 9—9 of FIG. 8.

FIG. 10 is a vertical cross section similar to that shown in FIG. 2, but showing a modified embodiment of the invention in which the end frame of the primary conveyor is mounted for vertical reciprocation.

FIG. 11 is a fragmentary perspective view at the transfer corner of a sanitary napkin pad transfer machine.

FIG. 12 is a fragmentary view similar to that shown in FIG. 11, but showing the pads in a different position.

FIG. 13 is a somewhat enlarged fragmentary plan view of the transfer corner shown in FIG. 11.

FIG. 14 is a fragmentary cross section taken along the line 14—14 of FIG. 13.

FIG. 15 is a fragmentary cross section taken along the line 15—15 of FIG. 13.

FIG. 16 is a fragmentary cross section taken along the line 16—16 of FIG. 14.

Preferred embodiments of the invention

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the embodiment shown in FIGS. 1 and 2, a continuous strip of pads 15, interconnected on embossed webs 21, are conveyed by the conveyor belts 16, 17 into the nip of the cutoff knife roller 18 and its platen roller 19. Belts 16, 17 typically convey the strip of pads 15 at a speed of 3200 inches per minute. The roller 18 typically carries a knife blade 20 which severs the pads 15 into discrete pads by cutting through the embossed webs 21.

From the cutoff knife 20, the pads 15 are delivered to an input conveyor which includes a primary single-lane conveyor 22. Conveyor 22 has coacting upper and lower belts 23, 25. These belts travel at a speed of 3800 inches per minute, thus to produce gaps 24 between successive pads 15, as shown in FIG. 2. The upper run of belt 25 travels over a support strip 26. In a practical embodiment of the machine designed to transfer diaper pads which are 16 inches long and 5 inches wide, as shown in FIGS. 8 and 9, belt 23 is 3½ inches wide and belt 25 and strip 26 are 2 inches wide.

The input conveyor further comprises two vertically spaced secondary belt conveyors 27, 28. Conveyors 27, 28 are respectively aligned with the correspondingly vertically spaced receiving aprons 31, 32 of a receiving table 33 to deliver the pads to the table in two lanes. Table 33 is typically disposed transversely to the path of travel of the pads on conveyors 22, 27, 28. Table 31 has a pad stop 34, and table 32 has a pad stop 35, against which the pads collect on the table.

Secondary conveyor 27 consists of a belt 36 which may typically travel at a speed of 3800 inches per minute, and an apron 37 along which the belt 36 conveys pad 15 in an upper lane. At a lower level or lane, conveyor 28 consists of conveyor belts 38, 39. Belt 39 travels over a fixed apron 40.

In accordance with the present invention, alternate pads 15 conveyed by primary conveyor 22 are delivered sequentially to the two lanes of secondary conveyors 27, 28, and the secondary conveyors deliver these pads alternately to the upper and lower receiving aprons 31, 32 on the receiving table 33. In the embodiment of the invention shown in FIG. 2, the pads are alternately fed to the secondary conveyors 27, 28 by a transfer mechanism comprising an elevator cam or wheel 43 which desirably consists of two like profiled cam disks 44, which are spaced apart axially a distance of about 2½ inches to receive therebetween the strip 26 and belt conveyor 25, as is best shown in FIG. 4.

Disks 44 of the lift wheel 43 are mounted on a cross shaft 45 which is driven in time with pad advance. In the disclosed embodiment in which there are two secondary conveyors 27, 28, lift wheel 43 has two peripheral lobe portions at different radii from shaft 45. Outer or high lobe 46 aligns with the lane of upper secondary conveyor 27. Inner or low lobe 47 aligns with the lane of lower secondary conveyor 28.

FIG. 2 illustrates the position of the left cam 43 when a pad 15 is being lifted by the high lobe 46 to align with the lane of the upper secondary conveyor 27. This is also shown in FIG. 4, where it is clear that the pad 15 has sufficient width to span across the space between the two disks 44 and be lifted up by the high lobe 46 under the advancing pressure of the belt 23 and the rotating wheel 43.

FIG. 6 and 7 illustrate the position of the wheel 43 when the next pad 15 arrives at wheel 43 in time to align with its low lobe 47 to simply pass directly through the gap between the high and low lobes and into the lane of the lower secondary conveyor 28.

It is clear from FIG. 4 that when the pad 15 is on the high lobe 46 of the lift wheel 43, it is supported along its margins, and its center is unsupported. As shown in FIG. 6, when the pad passes through the gap in the lift wheel 43, its center is supported by the belt 25 and strip apron 26, as well as at its margins by the low lobe 47. This support by the low lobe 47 is optional, as the lobe 47 could be lower and the pad would still be supported at the proper level by the belt 25.

The receiving table 33 is typically disposed at a right angle to the path of travel of the pads on the conveyors 22, 27, 28. In accordance with the present invention, the pads 15 are alternately discharged on separate lanes to the upper apron 31 and lower apron 32. The respective aprons 31, 32 are provided with vertically aligned longitudinal slots 50, 51. The push arms or dogs 52 of output chain conveyor 53 move along the slots 50, 51 to concurrently convey pads along both the upper apron 31 and lower apron 32. The chain conveyor 53 is driven in time with the arrival of pads 15 on the receiving table so as to concurrently propel a pair of pads, as shown in FIG. 3, in the direction of arrow 54 toward the stacking or elevator conveyor 55. Elevator conveyor 55 is of the same general construction as shown in my prior Patent 2,324,930, except that each paddle 56 on conveyor 55 will lift a pair of pads 15 for subsequent further transfer along the table 57 by the pusher arms 58 of chain conveyor 59. The dogs 52 need only move the pads 6 inches along aprons 31, 32 before they are clear of the next pair of pads delivered by the transfer conveyors 27, 28. Apron 31 has little longitudinal extent. Accordingly, its pad will descend onto the top of the pad on apron 32, as shown in broken lines in FIG. 3, and both pads will be thereafter conveyed in face relation. Conveyor 52, 53 is driven at such a speed and timed relation to conveyors 27, 28 to clear the aprons 31, 32 before the next pair of pads are discharged thereto.

As is clear from FIG. 2, the separation of the pads 15 into separate lanes of travel greatly increases the separation between next adjacent pads without requiring an excessive increase in speed in the pads. In a practical embodiment of the invention, the pads in the secondary conveyors 27, 28 are spaced apart 17 inches. Pad speed is kept low, for example, about 3800 inches per minute. At this speed the pads can easily negotiate the corner between the input and output conveyors.

The dimensions and speeds above given can be modified for different specific sizes and shapes of pads. The specific details recited herein are merely by way of example.

In FIG. 10, another embodiment of transfer mechanism is disclosed. In this embodiment the primary conveyor 62 has its input end belt support rollers 63 mounted on a fixed frame 64. However, its output end belt support rollers 65 are mounted on a vertically movable frame 66, the bottom of which is provided with a cam follower roller 67 which rides on the periphery of cam 68. When the cam 68 has its high lobe 71 engaged with the roller 67, the single lane of the conveyor 62 will be aligned with the elevated lane of uppermost secondary conveyor 72. When the roller 67 rides on the low lobe 73 of cam 68, the lane of primary conveyor 62 will be aligned with the separate lane of lowermost secondary conveyor 74. In this embodiment, there is a fixed partition apron 76 against which the respective belts 77, 78 of the two conveyors 72, 74 propel the pads 15 in spaced lanes. The receiving table 33 is the same as in the first described embodiment, and its various parts are given the same reference characters.

Accordingly, as the came 68 rotates in the embodiment of FIG. 10, successive pads 15 from a single-lane conveyor are alternately delivered to the spaced lanes of the upper secondary conveyor 72 and the lower secondary conveyor 74.

The embodiment shown in FIGS. 11 through 16 relates to a corner transfer mechanism for sanitary napkin pads 80. These have their longitudinal medial axes 81 transverse to the direction of movement of the input chain conveyor 82 and their transverse medial axes 83 aligned with the direction of movement of the input chain conveyor 82.

Input chain conveyor 82 is provided with pivotally mounted alternate high level push flights or fingers 84 and low level push flights or fingers 85. Fingers 84, 85 are of generally conventional construction. They respectively have guide tail extensions 86 which ride on reaction rail 87 to exert forward thrust on the pads 80 as the chain travels in the direction of arrow 117. Rail 87 terminates at its downstream end 89 to release the pads 80 from pusher flight thrust, as is illustrated in FIG. 14.

In this embodiment, the primary conveyor is that portion of the input chain conveyor 82 which advances pads 80 along input conveyor table 88. The secondary conveyor is that portion of the input chain conveyor 82 which feeds pads 80 along both of the vertically spaced lane aprons 91, 92 of a receiving table 93. Apron 91 has a transverse stop rail 94 and apron 92 has a transverse stop rail 95. The table 88 and aprons 91, 92 have slots 90 through which the push flights 84, 85 extend.

Intermediate the primary and secondary conveyor portions of the input conveyor there is a pad transfer switch plate 96 mounted on a hinge 97 to the discharge end of the table 88. Hinged plate 96 is actuated to swing vertically between full and broken lines shown in FIG. 14 by the vertical push rods 97 which are pivotally connected on pins 98 to the undersurface of the switch plate 96. Push rods 97 are guided for vertical movement in slide bearings 99, 103 which are mounted on side rails 100.

Vertical thrust is transmitted to the push rods 97 by a cam 104 turned by shaft 105. Cam 104 acts against a cam follower roller 106 journaled on bearing bracket 107 which depends from cross rail 108 which is fastened to the bottom ends of the rods 97. Accordingly, the rods transmit the motion of cam 104 to cyclically lift the switch plate 96 to its broken line position shown in FIGS. 11 and 14. When the high lobe of the cam 104 turns away from the roller 106, compression springs 109, which bear between bearing blocks 103 and rod support blocks 110, restore the plate 96 to its full line position shown in FIGS. 11 and 14, and require the roller 106 to follow the contour of the cam 104.

Cam 104 is timed with the chain conveyor 82 so that those pads 80 which are pushed by the low level flights 85 travel over the switch plate 96 when it is in its full line position, as shown in FIGS. 11 and 14, so that these pads 80 are delivered to the receiving table 93 on its lower lane apron 91 and thence against the end stop 94, at which point the pusher flights 85 retract to their position shown in FIG. 14.

Alternate pads 80 pushed by the high level flights 84 will arrive at the switch plate 96 when it is in its upwardly tilted broken line position shown in FIGS. 11 and 14, so that the high flights 84 push the pads up the ramp and onto the upper lane apron 92 of receiving table 93, and against the end stop 95 therealong, whereupon flights 84 retract. In this manner the time interval and distance spacing between successive pads which arrive respectively against stops 94, 95 is doubled, as compared to what it would be if there were but a single lane.

The pads arrive against stops 94, 95 in a direction aligned with their minor axes 83. They are removed transversely by output conveyor 112 in a direction aligned with their major axes 81. Conveyor 112 comprises a chain 113 having alternate high pusher flights or paddles 114 and low pusher flights or paddles 115. Chain 112 is so timed with chain 82 that its high pusher flight 114 removes a pad 80a (FIG. 11) along stop rail 95 of the upper lane apron 92 of receiving table 93 at substantially the same time that the input conveyor 82 delivers pad 80b against the stop rail 94 on the low lane apron 91 of receiving table 93.

This concurrent delivery and discharge of pads on separate lanes illustrates the desirability of the multiple lane arrangement. Pads are concurrenty delivered and removed from the corner without interference between the pads and between the conveyors because the pads and conveyor flights are on spaced, separated lanes. FIG. 12 illustrates how the increased separation and time interval between successive pads on one of the lanes (upper lane apron 92) provides ample time for the successive pads and push paddles on a lane to clear the corner without interference from the next arriving pad and pusher paddle. In this view, pad 80a has cleared the corner in the direction of arrow 116 before the next pad 80c arrives at the corner in the direction of arrow 117. The same sequence occurs in the lower lane apron 91.

As illustrated in FIG. 15, output conveyor 112 will deliver succesive pads from the upper and lower lane aprons 92, 91 of the receiving table 93 onto a take-away chain conveyor 118 which has pusher lugs 19 between which the respective pusher flights 114, 115 of conveyor 112 will deposit successive pads 80.

Accordingly, the pad corner transfer machine of the present invention separates the pads at the corners into multiple lanes to increase the spacing and time interval between pads on each lane, thus to facilitate the pad and conveyor elements clearing the corner before the next pad on its lane reaches the corner.

I claim:

1. A pad corner transfer machine comprising:
   an input conveyor for moving pads in one direction to a corner,
   a transverse output conveyor to remove pads from said corner in a transverse direction,
   a receiving table at the corner and having stops against which pads are delivered by the input conveyor,
   said input conveyor comprising a single primary conveyor to convey all such pads on one lane and a plurality of spaced secondary conveyors to deliver pads received from said primary conveyor to said table stops on different lanes,
   a transfer mechanism to feed successive pads from the one lane of the primary conveyor in sequence to the different lanes of the respective secondary conveyors whereby successive pads are received against said stops on different lanes,
   the lanes of said secondary conveyors being vertically spaced,
   said receiving table having vertically spaced receiving aprons aligned therewith.

2. The machine of claim 1 in which said output conveyor has means for concurrently removing the pads on the vertically spaced aprons.

3. The machine of claim 1 in which said output conveyor has means for successively removing the pads on the vertically spaced aprons.

4. The machine of claim 1 in which said transfer mechanism comprises a lift wheel intermediate said primary and secondary conveyors, said wheel having a high lobe and a low lobe, said high lobe being aligned with the lane of the upper secondary conveyor, the low lobe being at a lower level to pass the pads past the wheel to the lane of the lower secondary conveyor.

5. The machine of claim 1 in which said transfer mechanism comprises a support frame for the output end of the primary conveyor, and mechanism for raising and lowering said frame to sequentially align the primary conveyor with said secondary conveyor.

6. The machine of claim 1 in which said transfer mechanism comprises a switch plate intermediate said primary and secondary conveyors.

7. The machine of claim 4 in which said lift wheel comprises laterally spaced disks, said primary conveyor comprising a belt disposed between said disks to convey pads beyond said lift wheel when the pads are passed by the low lobe of the wheel.

8. The machine of claim 1 in which said output conveyor comprises push paddles disposed to align successively with said vertically spaced lanes to successively remove pads from the spaced aprons of the receiving table.

9. A pad corner transfer machine comprising:
   an input conveyor for moving pads in one direction to a corner,
   a transverse output conveyor to remove pads from said corner in a transverse direction,
   a receiving table at the corner and having stops against which pads are delivered by the input conveyor,
   said input conveyor comprising a single primary conveyor to convey all such pads in one lane and a plurality of spaced secondary conveyors to deliver pads received from said primary conveyor to said table stops on different lanes,
   a transfer mechanism to feed successive pads from the one lane of the primary conveyor in sequence to the different lanes of the respective secondary conveyors whereby successive pads are received against said stops on different lanes,
   said pads having longitudinal and transverse axes,
   said pads being conveyed on said input conveyor in a direction aligned with one axis and being removed from the table by the output conveyor in a direction aligned with the other axis.

10. A pad corner transfer machine comprising:
    an input conveyor for moving pads in one direction to a corner,
    a transverse output conveyor to remove pads from said corner in a transverse direction,
    a receiving table at the corner and having stops against which pads are delivered by the input conveyor,
    said input conveyor comprising a single primary conveyor to convey all such pads on one lane and a plurality of spaced secondary conveyors to deliver pads received from said primary conveyor to said table stops on different lanes, a transfer mechanism to feed successive pads from the one lane of the primary conveyor in sequence to the different lanes of the respective secondary conveyors whereby successive pads are received against said stops on different lanes, said output conveyor comprising means for removing a pad from the receiving table on one lane while the input conveyor is delivering a pad to the receiving table on another lane.

References Cited

UNITED STATES PATENTS

| | | | |
|---|---|---|---|
| 1,741,616 | 12/1929 | Crady | 198—31 |
| 2,612,984 | 10/1952 | Alden | 198—35 |

EDWARD A. SROKA, *Primary Examiner.*